Nov. 18, 1958 E. C. BERNHARDT ET AL 2,860,377
METHOD FOR EXTRUDING AND FOAMING RESIN
Filed Aug. 31, 1955
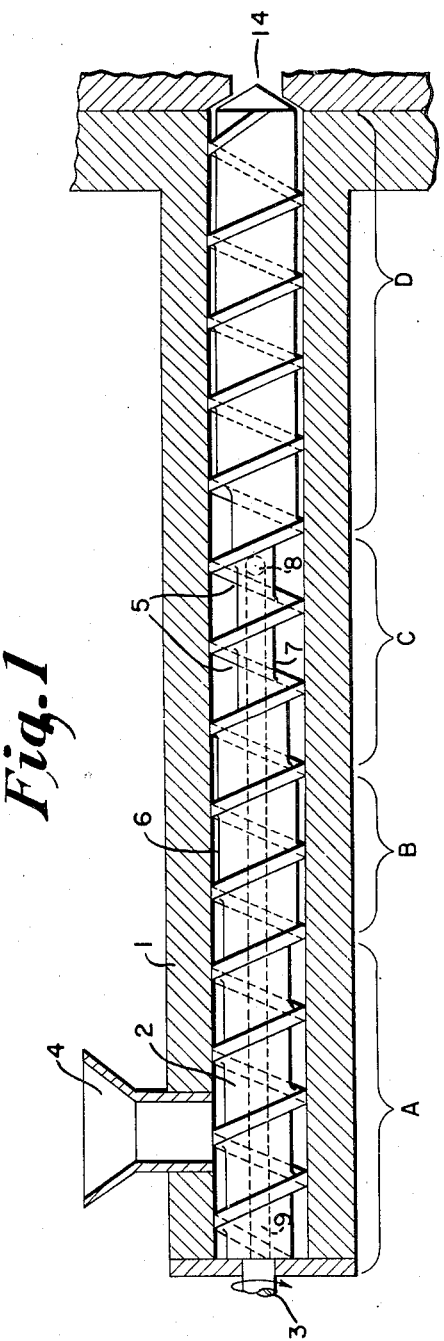
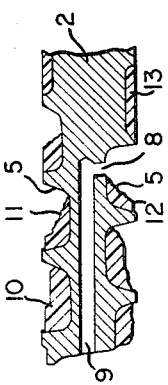
INVENTORS
ERNEST CARL BERNHARDT
HAROLD BARNARD WHITFIELD, JR.
BY
ATTORNEY United States Patent Office 2,860,377
Patented Nov. 18, 1958

2,860,377

METHOD FOR EXTRUDING AND FOAMING RESIN

Ernest Carl Bernhardt and Harold Barnard Whitfield, Jr., Wilmington, Del., assignors to E. I. du Pont de Nemours and Company, Wilmington, Del., a corporation of Delaware Application August 31, 1955, Serial No. 531,771

5 Claims. (Cl. 18—48)

This invention relates to a method for extruding resin while at the same time producing a resin foam. The invention also relates to a novel method and process for admixing a gas with a resin and for producing foamed articles therefrom.

It has been discovered in accordance with this invention that a plastic material can be converted to a foam by dissolving a gas such as nitrogen, therein at elevated pressure while the said plastic is being advanced through an extruder barrel by the action of a rotating extrusion screw, and thereafter releasing said plastic through a die whereby a plastic foam is produced.

In a preferred embodiment the apparatus employed in the practice of this invention is that disclosed by E. C. Bernhardt in his copending U. S. patent application S. N. 425,985, now U. S. Patent 2,774,105, issued December 18, 1956. This apparatus comprises an extrusion screw (having special characteristics described below) which cooperates with an extrusion barrel and an extruder feeding means in the manner shown in Figure 1.

In Figure 1 the entire device is divided into four sections indicated by the letters A, B, C, and D. The section designated as A is known as the feed section. Section B is known as the metering or throttle section. Section C is known as the gas-intake section. Section D is known as the extrusion section. The apparatus consists essentially of a barrel 1, into which there is fitted a screw device 2, which is rotatably driven in the indicated direction by a suitable power source connected at 3. The resin is continuously fed into section A through feed hopper 4. The resin is advanced by the rotation of screw 2 through sections A, B, and C and D in that order. By the time the resin has reached section B it is a viscous melted material. In section B the root diameter of the screw has been increased to such an extent that the channel through which the plastic travels is considerably reduced in size, whereby the flow of the plastic melt is throttled. It is preferable that the root diameter of the screw be increased gradually from some point in the center of section A to the entrance of section B although such an increase in the root diameter may take place if desired over something less than a pitch length of the screw. At the entrance to section C the root diameter of the screw is reduced, which makes the drag flow capacity (defined at page 974, Industrial and Engineering Chemistry, May 1953) in section C greater than in section B. In section C there is a space 5 in which the plastic material becomes mixed with nitrogen or other gas. The melt leaving section B thus comes in contact with an inflowing stream of nitrogen or other gas, admitted through the port 8. If it is convenient or desirable, the barrel 1 which surrounds the screw may be heated by steam coils, electric coils, or the like. Section D is merely an ordinary extrusion device wherein a preferably smooth barrel surrounds the screw 2 and plastic material is forced through the section and out a convenient die such as indicated at 14. The drag flow capacity in section D is greater than that in the metering zone, or at least equal thereto.

Section B is usually no less than about two pitch lengths of screw 2. In this section the root diameter of screw 2 is at its maximum value having been increased to the diameter shown at 6. Such a restriction as indicated at section B may serve more than one purpose since this restriction throttles the flow, and may act as a metering device to gauge the flow of plastic material through the entire extrusion device as well as increase the temperature of the plastic material just prior to its introduction into section C shown in Figure 1. The root diameter of screw 2 is sharply reduced (as shown in somewhat exaggerated fashion at 7) in the gas-intake zone of section C, an arrangement which provides for preventing backward motion of the gas from section C to section B.

An essential and critical feature of the present invention is the means provided for admission of gas or vapor into section C. It is surprising that by providing an opening 8 communicating with the bore 9, in the extrusion screw, it becomes possible to inject gas into the space 5 in such manner as to produce a foamed extrudate. The location of opening 8 is related to the tendency of the device to accumulate resin at the rearward part of space 5, leaving free space in the forward portion. The port 8 may be located at that part of the zone C where the channel is not occupied by resin. A superatmospheric pressure is preferably employed to produce solution of the gas in the resin. The terms "solution" and "dissolving" as employed herein mean any of the forms of physical association or combination which effect a sufficiently homogeneous physical admixture to produce a foam when the pressure is released, as herein described. It is noteworthy that solution takes place more readily at elevated temperatures than at lower temperatures.

The functioning of the means for introducing gas into the zone C, in a specific embodiment, is shown in more detail in Figure 2, which is a cross section view of a fragment of the screw 2, in the forward portion of section C, showing how the molten plastic is distributed therein during operation of the device. In the absence of injected gas, unfoamed resin collects in front of the screw thread, in the advance thereof. As the resin advances into section D, it is usually compressed so as to occupy a major part of the channel as shown at 13.

Section D, as shown in Figure 1, is a pressure zone which has a drag flow capacity at least as great as that of the metering zone, and generally less than that of the gas injection zone. The pressure zone D communicates directly with the extrusion die 14.

Figure 3 shows an expanded plastic rod as extruded by use of the above-described screw.

The following example serves to illustrate this invention.

*Example*

A foamed rod of polyethylene with a density of 35 pounds per cubic foot was produced by use of the apparatus just described. Nitrogen gas at 100–200 p. s. i. was introduced into the core of the screw while the polyethylene was advanced through the extruder. Upon the introduction of the nitrogen, a bubble-free rod of polyethylene was shortly replaced by a foamed rod. The rod contained small, individual bubbles. The foamed polyethylene was produced at extrusion rates of 8 to 32 pounds per hour. Wall temperatures of the extruder employed in this example were (a) Section A—150° C.
(b) Section B—200° C.
(c) Section C—250° C.
(d) Section D—250° C.

This resulted in a melt temperature of 230–250° C. Screw speed was varied from 10 to 60 R. P. M. without affecting the foam. The polymer used in this example was commercial polyethylene having a density of about 0.92. The density of the foamed rod varied as the pressure of nitrogen within the core was varied, and was less than 35 pounds per cubic foot as the pressure was raised to somewhat about 200 p. s. i.

Although the device of this invention has been described in terms of a single screw and barrel, it is not intended that such limitation be necessarily imposed on this apparatus or process. The features of this invention are equally applicable to multiple screw extruders. One example of such is a twin screw extruder, wherein two screws which are identical, except that one has a right-hand thread while the other has a left-hand thread, are employed in a side-by-side relationship and are rotated toward each other in the nature of meshed gears or rolling mills. These multiple screws may be intermeshing or non-meshing with adjacent screws.

Moreover, the means providing communication between the hollow core 9 and the space 5 may be more than one port instead of only one, as shown in the drawing. The gas (or source of vapor) may be admitted via an injection pump or other similar fluid pressure producing device, or may be a flow of gas under no superatmospheric pressure.

The invention is not limited to the employment of screws and cooperating barrels having helical threads which have a constant pitch, although such constant pitch serves the intended purpose satisfactorily. In many embodiments of this invention, however, it may be advantageous to employ a screw with a variable pitch in one or more of the described sections of the extrusion device. Various combinations of variable and constant pitch threads will be apparent to those skilled in the art; for example, a screw with a variable pitch thread, or a screw with a variable pitch in the feed section and throttling section and a constant pitch in the gas intake section and extrusion section. These, and other combinations, are intended to be included in the herein-described invention.

The solid-foam-producing device of this invention is useful in the processing of many of a variety of plastic materials where it is desired to blend plasticizers, pigments, fillers, and other materials with a polymer in a dispersion form and to produce an extrudate readily for molding into a shape. It will be appreciated that the exit of this device may be fitted with any of a variety of molds, dies, calendering rolls and other known devices which are useful in transforming a molten plastic into sheets, rods, tubes, and articles of any shape whatever.

If desired, the method of this invention can be applied by use of a separate series of zones added to an extruder screw of the kind described in the Bernhardt application S. N. 425,985, filed April 27, 1954.

We claim:

1. The method of producing a plastic foam which comprises dissolving a gas in a plastic material while the said material is being advanced through an extruder barrel by the action of a rotating extruder screw, and extruding the plastic through a die, whereby the extruded plastic foams due to release of said gas therefrom, said screw having a zone of greater drag flow capacity following a throttling zone of lesser drag-flow capacity, said screw having a hollow core communicating with said zone of greater drag-flow capacity, said communication being positioned in the forward half of a channel between threads in the zone of greater drag flow capacity, said gas being introduced into said plastic material through said communication.

2. Method of claim 1 wherein the said plastic material is polyethylene.

3. Method of claim 2 wherein the said gas is nitrogen.

4. A method for producing a polyethylene foam which comprises conducting polyethylene through a series of zones in a channel between a rotating extrusion screw and a barrel cooperating therewith, one of said zones having a greater drag-flow capacity than a preceding and a following zone, said zone of greater drag-flow capacity being only partially filled with molten plastic, while injecting gas through a port at a site within said zone of greater drag-flow capacity, which site is in the forward half of the channel between threads occupied by the molten plastic during the rotation of the said screw, said port communicating through a hollow core in said screw with a means for supplying the said gas at superatmospheric pressure, whereby said gas dissolves in said polyethylene, and thence conducting said polyethylene, having said gas dissolved therein, directly by means of said extruder screw through a die, whereby said polyethylene foams due to release of said gas therefrom.

5. A process of claim 4 wherein the said gas is nitrogen.

References Cited in the file of this patent

UNITED STATES PATENTS 2,515,250    McIntire _____ July 18, 1950

FOREIGN PATENTS 1,081,583    France _____ Dec. 21, 1954

UNITED STATES PATENT OFFICE
CERTIFICATE OF CORRECTION

November 18, 1958

Patent No. 2,860,377

Ernest Carl Bernhardt et al.

It is hereby certified that error appears in the printed specification of the above numbered patent requiring correction and that the said Letters Patent should read as corrected below.

Column 3, line 8, for "about 200 p. s. i." read -- above 200 p. s. i.--.

Signed and sealed this 24th day of February 1959.

(SEAL)
Attest:

KARL H. AXLINE
Attesting Officer

ROBERT C. WATSON
Commissioner of Patents